(12) United States Patent
Allard

(10) Patent No.: US 6,527,477 B1
(45) Date of Patent: Mar. 4, 2003

(54) EROSION CONTROL ROLLS

(75) Inventor: Douglas Paul Allard, Santa Rosa, CA (US)

(73) Assignee: KriStar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 09/660,223

(22) Filed: Sep. 12, 2000

Related U.S. Application Data

(63) Continuation-in-part of application No. 09/479,341, filed on Jan. 7, 2000.

(51) Int. Cl.[7] ............................................... E02B 11/00
(52) U.S. Cl. ........................ 405/45; 405/49; 405/302.6
(58) Field of Search .............................. 405/36, 37, 43, 405/44, 45, 49, 46, 47, 48, 52, 53, 302.4, 302.6, 302.7

(56) References Cited

U.S. PATENT DOCUMENTS

| | | | | |
|---|---|---|---|---|
| 3,103,789 A | * | 9/1963 | McDuff et al. ................ 405/45 |
| 3,917,530 A | * | 11/1975 | Boske ......................... 405/36 |
| 3,936,380 A | | 2/1976 | Boske ......................... 210/170 |
| 3,946,762 A | | 3/1976 | Green ......................... 138/140 |
| 3,976,578 A | * | 8/1976 | Beane ......................... 405/43 |
| 4,182,580 A | * | 1/1980 | Hieda et al. .................. 405/43 |
| 4,182,581 A | * | 1/1980 | Uehara et al. ................ 405/43 |
| 4,624,603 A | * | 11/1986 | Kanao ......................... 405/43 |
| 4,950,103 A | * | 8/1990 | Justice ........................ 405/43 |
| 5,338,131 A | | 8/1994 | Bestmann .................... 405/24 |
| 5,419,003 A | * | 5/1995 | Tollasepp .................. 15/230.11 |
| 5,537,745 A | * | 7/1996 | Musch et al. ................ 29/33 D |
| 5,575,588 A | | 11/1996 | Nakamura .................... 405/18 |
| 5,595,458 A | | 1/1997 | Grabhorn .................... 405/258 |
| 5,693,141 A | * | 12/1997 | Tramont ..................... 118/211 |
| 5,769,769 A | * | 6/1998 | Torntore ..................... 15/144.1 |
| 5,954,451 A | * | 9/1999 | Presby ......................... 405/49 |
| 6,076,992 A | * | 6/2000 | Fukui .......................... 405/43 |
| 6,260,232 B1 | * | 7/2001 | Nelson et al. ................ 15/321 |

FOREIGN PATENT DOCUMENTS

| | | | |
|---|---|---|---|
| DE | 2127726 | * | 12/1972 |
| DE | 3236820 | * | 4/1984 |

OTHER PUBLICATIONS

American Excelsior Company, Suggested Specification for Excelsior Degradable Sediment Control Rolls (Sep. 1996) (5 pages).

CD43(2) Fiber Rolls, Caltrans Storm Water Quality Handbooks, Construction Contract's Guide and Specifications (Apr. 1997) (3 pages).

* cited by examiner

*Primary Examiner*—Frederick L. Lagman
(74) *Attorney, Agent, or Firm*—Howrey Simon Arnold & White, LLP

(57) ABSTRACT

An erosion control device is described. A walled elongated core member is disclosed having a first open end, a second end, an interior space and one or more openings in the wall communicating the interior space with the exterior of the core member. An outer filter member surrounds the core member. One or both the first and second ends of the core member can be open. One or both of the open ends can comprise couplers or connectors for connecting one core member to one or two complimentary core members. The core member may comprise a flexible plastic pipe, such as high-density polyethylene pipe having a plurality of perforations.

34 Claims, 7 Drawing Sheets

EROSION CONTROL ROLLS

FIELD OF THE INVENTION

This is a continuation in part of U.S. patent application Ser. No. 09/479,341 filed Jan. 7, 2000. The present invention relates to erosion control and more particularly to devices and apparatuses for use in controlling sedimentation and debris flow associated with soil erosion.

BACKGROUND OF THE INVENTION

Controlling soil erosion, such as erosion on slopes in construction sites, and particularly the sedimentation and debris carried in fluid flow on slopes is a continuing problem. Fiber rolls (also known as wattles) are the current industry standard for use in controlling erosion. Fiber rolls are typically made of fibrous materials such as straw or excelsior (shredded wood) made into rolls that are held together with netting. During construction, the rolls are placed across the face of a slope to curtail soil erosion and to darn, direct and/or filter fluid flow as the fluid flows down the slope. Silt fences, generally black porous cloth strung vertically on wooden stakes across a slope, are alternative means of controlling erosion. However, most regulatory agencies now discourage the use of silt fences due to the propensity for silt fences to collapse from high fluid flows and high winds.

Fiber rolls have been found to be more capable of performing the erosion control function than silt fences. However, fiber rolls are deficient in their ability to direct fluid flow in a controlled manner. Moreover, numerous fiber rolls are generally required due to their inherent deficiencies in directing fluid flow as the flow proceeds down a slope. Accordingly, more effective devices and systems are desired for controlling soil erosion and debris flow.

SUMMARY OF THE INVENTION

The present invention comprises a walled elongated core member having a first open end, a second end, an interior space and one or more openings in the wall communicating the interior space with the exterior of the core member. An outer filter member surrounds the core member. In one embodiment, both the first and second ends of the core member are open. One feature of the present invention is the ability to connect a plurality of core members together. Accordingly, one or both of the open ends can comprise couplers or connectors for connecting one core member to one or two complimentary core members. The core member may comprise a flexible plastic pipe, such as high-density polyethylene pipe having a plurality of perforations.

In another embodiment, the couplers can comprise tee connectors or elbow connectors. One advantage of the present invention is the ability to connect outlet pipes to tee or elbow connectors for directing fluid flow received by the core members to desired locations downstream of the core members.

The outer filter member may comprises a fiber roll. In one embodiment the fiber roll comprises excelsior or straw. In another embodiment, the filter member may comprise a porous foam material. A porous covering material, such as a woven cloth or netting may surround the outer filter member.

In another embodiment, the elongated core member is corrugated, comprising a plurality of ribs extending along a least a portion of the exterior surface of the core member. One or more openings in the ribs communicate the interior of the core member with the exterior surface of the core member.

In another embodiment, the elongated core member comprises a flexible material have an interior space that is at least partially filled with a ballast material such as sand, gravel or the like. The elongated core member may further comprise openings communicating the exterior of the core member with the interior of the core member. One or more core members can be coupled together and strategically arranged to control the flow of sedimentation and debris.

DETAILED DESCRIPTION OF THE INVENTION

The present invention is directed to an apparatus for use in controlling sedimentation and debris flow, especially on slopes. The present invention is particularly useful in controlling erosion resulting from sedimentation and debris flow on slopes in construction sites and other areas where soil erosion poses environmental issues.

Figure 1:
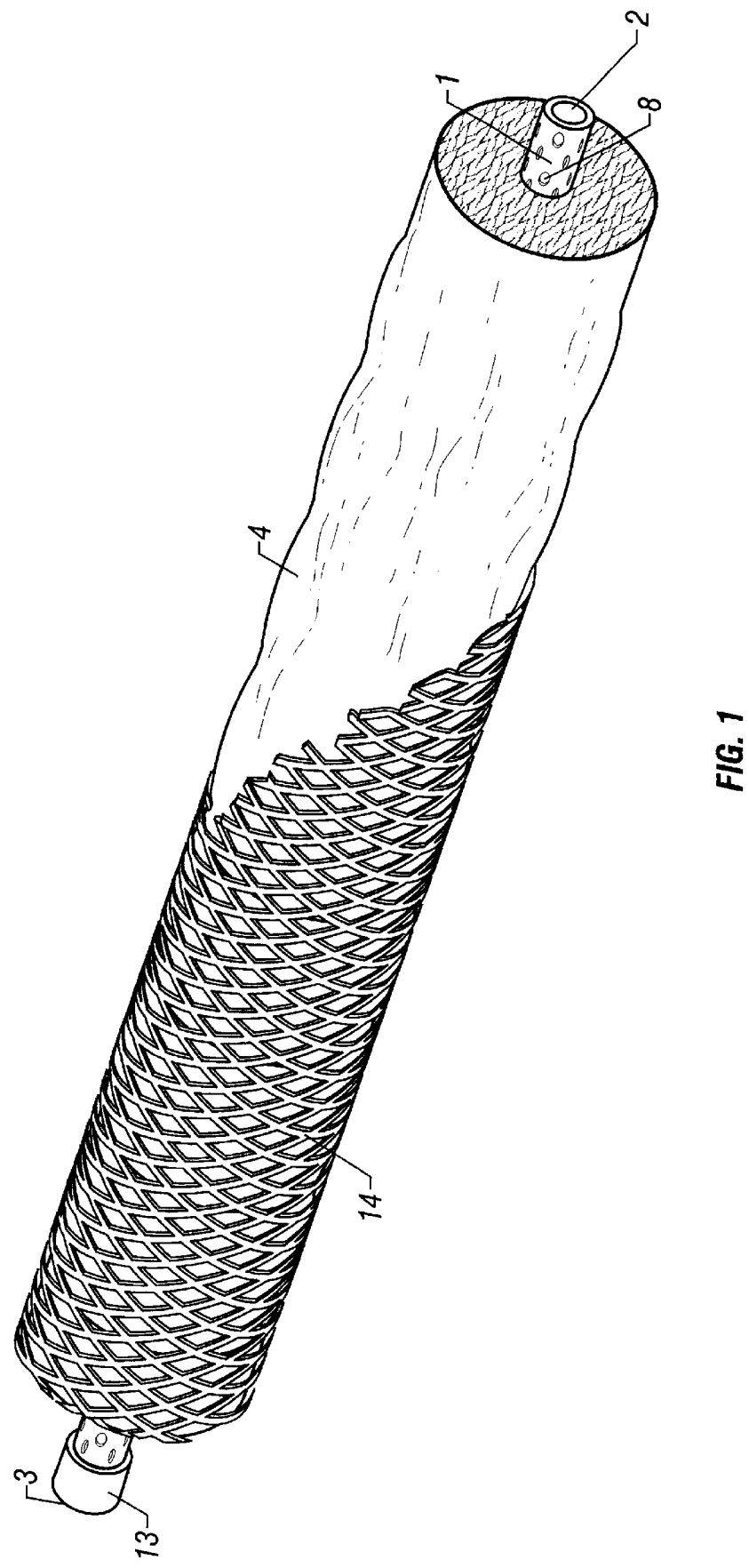
FIG. 1 is a perspective view of one emodiment of the present invention.

Referring to FIG. 1, one embodiment of the present invention is shown having a walled elongated core member 1, a first open end 2 and a second open end 3. The elongated core member has a longitudinal axis and a periphery extending around the core member in a line perpendicular to the longitudinal axis. The elongated member has an interior space and one or more openings in the wall communicating the interior space with the exterior of the core member. An outer filter member 4 surrounds the core member. In a preferred embodiment, both the first and second ends of the core member are open. One feature of the present invention is the ability to connect a plurality of core members together. Accordingly, one or both of the open ends can comprise couplers or connectors 13 for connecting one core member to one or two complimentary core members. The core member may comprise a flexible plastic pipe, such as high-density polyethylene pipe having a plurality of perforations. The connectors can be standard industry connectors or couplers for coupling piping such that the connected piping is in fluid communication with each other.

Figure 2A:
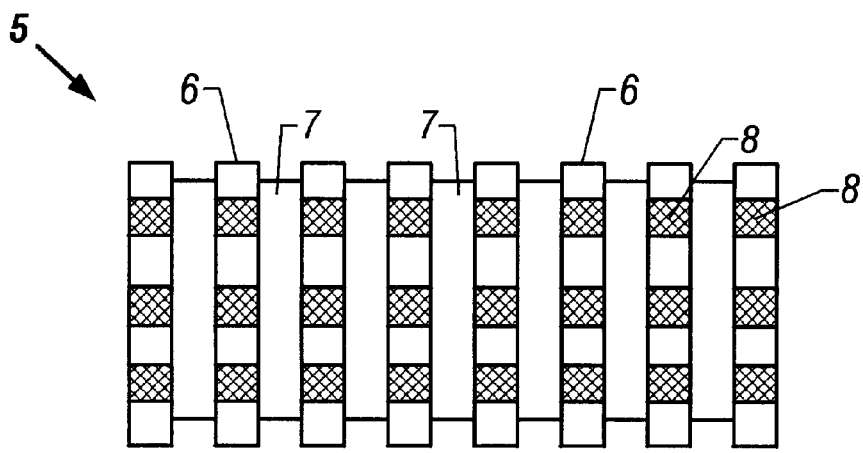
FIG. 2A is a front view of one embodiment of the present invention illustrating a corrugated core member.
Figure 2B:
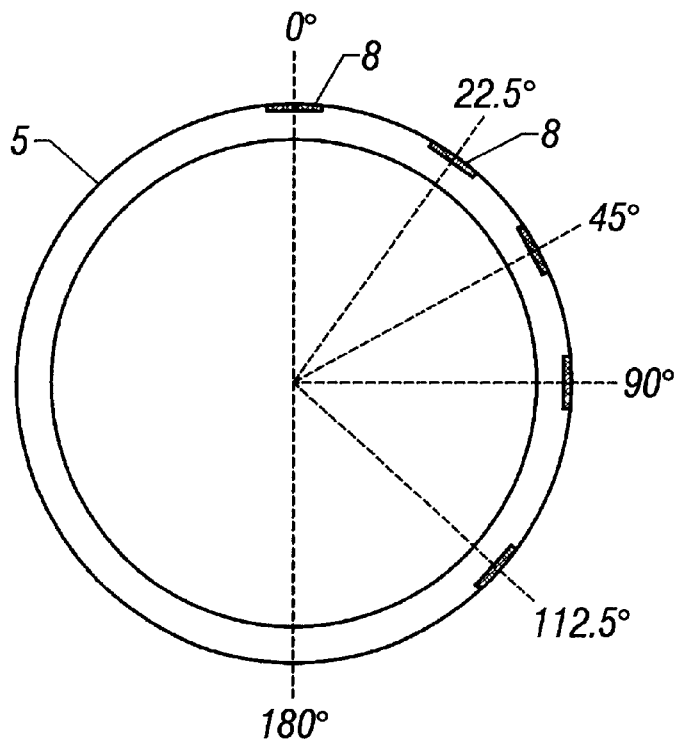
FIG. 2B is a side view of the corrugated core member illustrated in FIG. 2A.

Referring to FIGS. 2A and 2B, a corrugated core member 5 is illustrated showing ribs 6 and valleys 7. The ribs extend along at least a portion of the exterior surface of the core member. In the embodiment illustrated, the ribs extend along the periphery (i.e, perpendicular to the longitudinal axis of the member) of the exterior of core member. In an alternative embodiment, the ribs may extend along at least a portion of the exterior surface of the core member in a position parallel to the longitudinal axis of the member. One or more openings 8 are situated in one or more of the ribs. Preferably the openings are elongated slots located across the top of the rib. It is particularly preferred to locate a plurality of openings in the rib at spaced intervals along the periphery of the core member. For example, as more specifically illustrated in FIG. 2B, it is particularly preferred to space a plurality of openings from a first opening along the periphery of the member within a 180 degree arc as measured from the longitudinal axis of the core member. A particularly preferred pattern is to space four openings from a first opening at positions of approximately 22.5 degrees, 45 degrees, 90 degrees and 112.5 degrees from the first opening as measured along an arc from the longitudinal axis of the core member. In practice, the first opening is situated in the rib near the top of the core member (as it will be positioned in the particular erosion control and debris flow application) such that the additional openings will be situated towards the upstream side of the fluid flow path.

Figure 3:
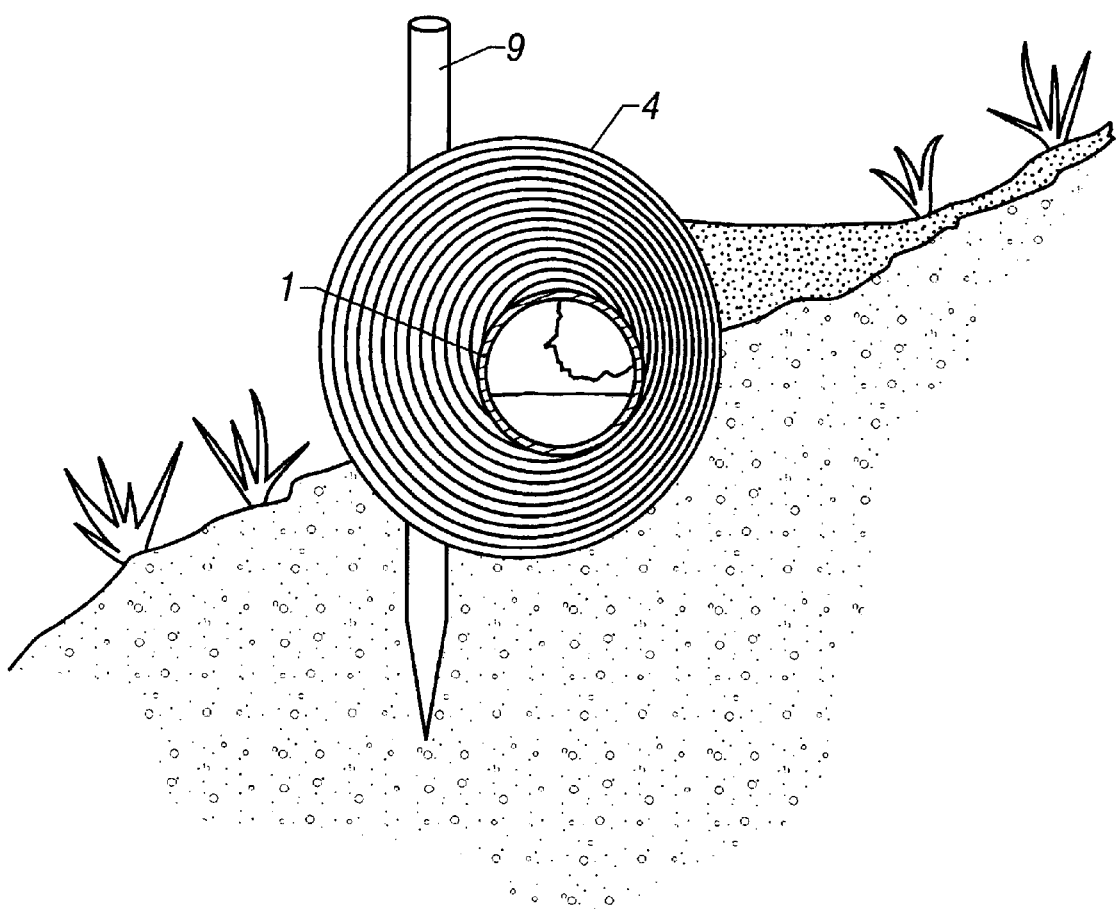
FIG. 3 is a side view of one embodiment of the present invention illustrating an eccentrically positioned core member within an outer filter member.

Referring to FIG. 3, the core member 1 is illustrated positioned within a filter member 4, such as a fiber roll, and anchored in place on a slope with an anchor 9, such as a stake. In the embodiment illustrated, the core member is positioned eccentrically within the filter member. As indicated previously with respect to FIGS. 2A and 2B, in a particularly preferred embodiment the openings in the rib are such that a first opening is situated near the top of the core member, and additional openings are positioned spaced apart from the first opening and upstream of the fluid flow path.

Figure 4:
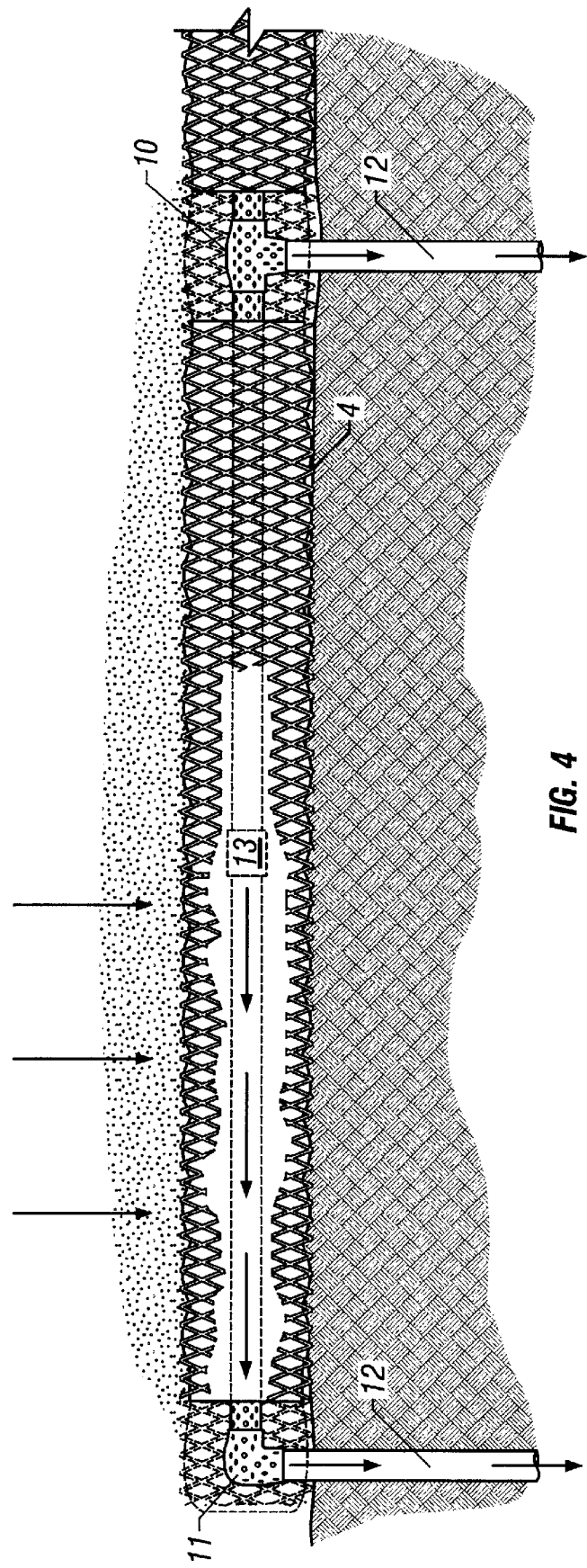
FIG. 4 is a front view of one embodiment of the present invention showing core members interconnected to each other and to outlet pipes.

Referring to FIG. 4, the couplers can comprise tee connectors 10 or elbow connectors 11. One advantage of the present invention is the ability to connect outlet pipes 12 to tee or elbow connectors for directing fluid flow received by the core members to desired locations downstream of the core members.

The outer filter member may comprise a fiber roll. In one embodiment the fiber roll comprises excelsior or straw. Referring again to FIG. 1, the filter member may comprise a porous foam material. As discussed, a porous covering material 14, such as a woven cloth or netting may surround the outer filter member. In a preferred embodiment wherein a plurality of core members are interconnected, the outer filter material will cover the couplers or connectors as well.

Figure 5:
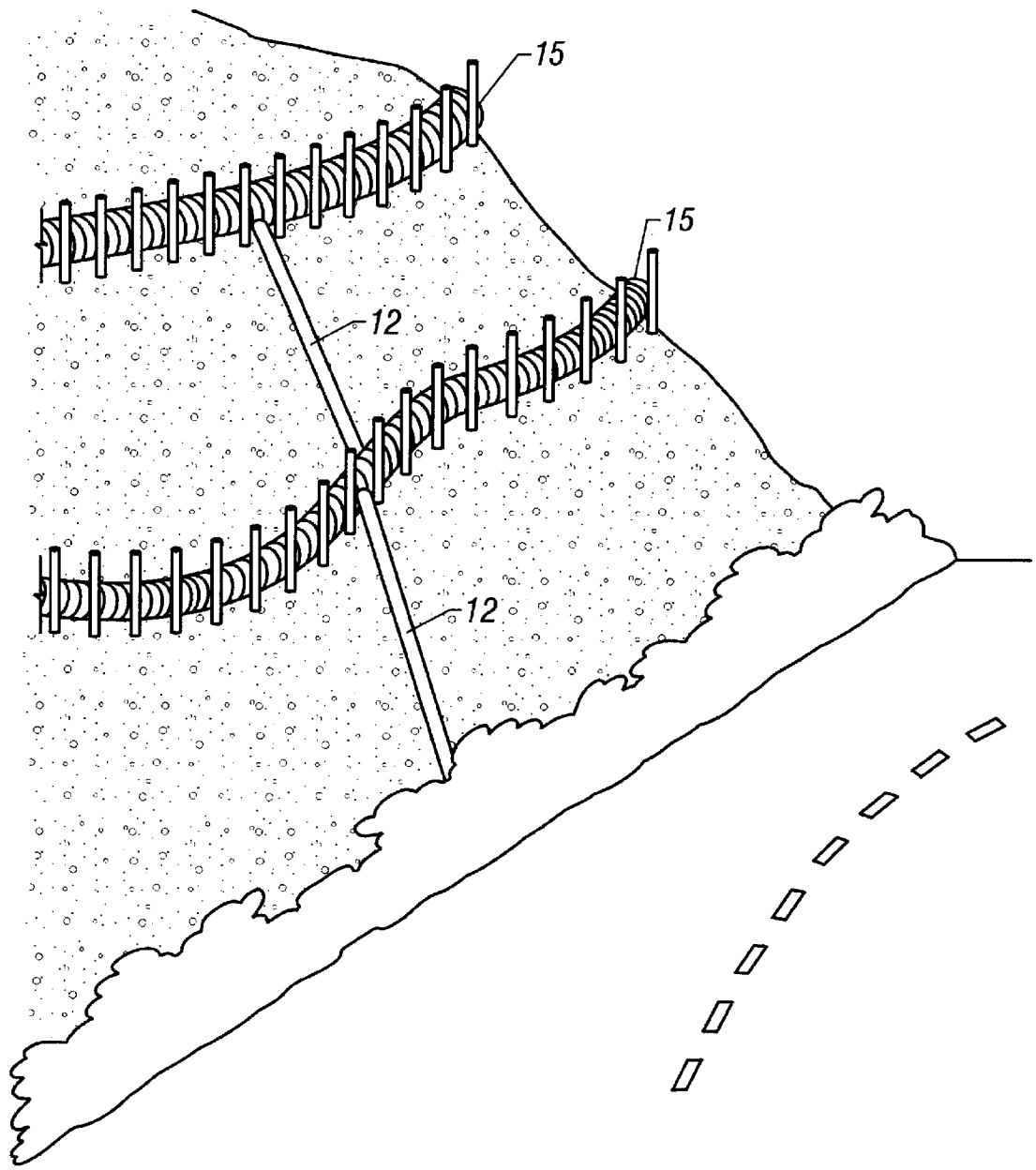
FIG. 5 is a perspective view of one embodiment of the present invention deployed on a sloping surface.

Referring to FIG. 5, interconnected core members and filter material combinations 15 are illustrated anchored to a slope. Outlet pipes 12 are shown interconnecting rows of interconnected members to move fluid in a controlled manner from the upper portion of the slope through the core members and outlet pipes to the bottom of the slope.

Figure 6:
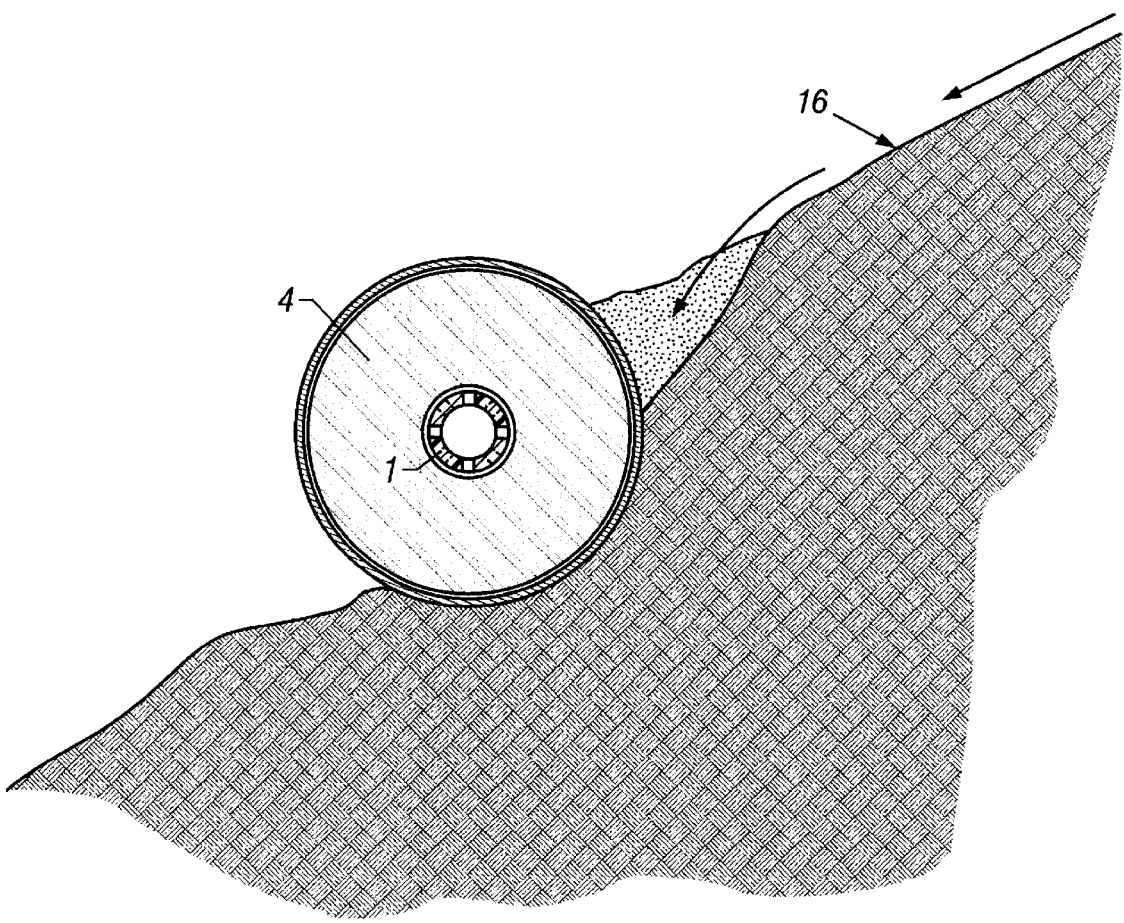
FIG. 6 is a side view of one embodiment of the present invention illustrating its placement on a slope.

Referring to FIG. 6, in practicing one embodiment of the invention, the core member 1 surrounded by the outer filter member 4 may be placed on a slope 16. Fluid carrying sedimentation or debris encounters the filter member. Fluid, debris and sedimentation not retained by the filter material enters the core member via one or more openings or perforations and is routed out of one or both ends of the core member. To retain the core member and filter member in the desired location, the slope may be notched. For example, for a core member having a 2 to 4 inch diameter, the slope may be notched to a depth of approximately three inches.

Figure 7:
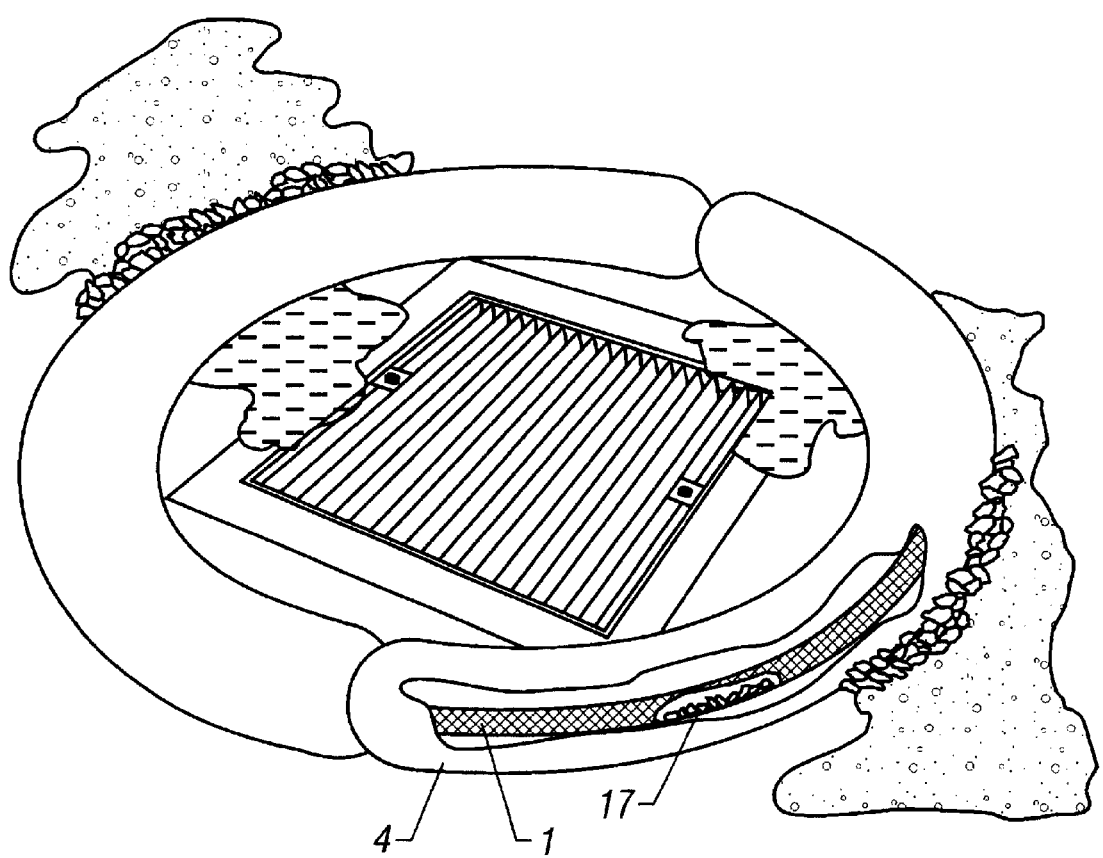
FIG. 7 is a perspective view of one embodiment of the present invention illustrating its placement around a drain inlet.

Referring to FIG. 7, another embodiment of the present invention is illustrated showing interconnected core members 1 surrounded by filter members 4. In this embodiment, at least a portion of the interior of the core member contains a ballast material, such as sand, gravel and the like. In this application, the core member's exterior surface may or may not have as the particular application requires. A flexible core member, such as a flexible plastic pipe allows the core members to be interconnected and positioned in a variety of ways, such as a circle surrounding a drain inlet as illustrated.

Numerous other variations and embodiments can be discerned from the above detailed description of the invention and illustrations thereof, and all such variations are encompassed within the scope and spirit of the present invention.

What is claimed is:

1. An apparatus, comprising:
   (a) a walled elongated core member having a longitudinal axis and a periphery extending around said core member in a line perpendicular to said longitudinal axis, said core member further defined by a first end, a second end, an exterior surface and an interior space, wherein said core member is at least partially filled with a ballast material;
   (b) a plurality of ribs extending along at least a portion of said exterior surface of said elongated core member; and
   (c) one or more openings in one or more of said ribs communicating said interior space with the exterior surface of said core member.

2. The apparatus of claim 1 wherein said ribs extend along at least a portion of said exterior surface of said elongated member in a line parallel to said longitudinal axis.

3. The apparatus of claim 1 wherein said ribs extend along at least a portion of said periphery of said exterior surface of said elongated member.

4. The apparatus of claim 1 wherein two or more of said openings are spaced apart along the periphery of said core member.

5. The apparatus of claim 1 wherein two or more of said openings are spaced apart along the longitudinal axis of said core member.

6. The apparatus of claim 4 or 5 wherein one or more of said openings comprise longitudinal slots.

7. The apparatus of claim 4 wherein said two or more openings further comprise a first opening and one or more additional openings spaced apart from said first opening at points within 180 degrees from said first opening as measured along an arc from said longitudinal axis.

8. The apparatus of claim 7 wherein said additional openings comprise four openings spaced apart from said first opening at points within 180 degrees of said first opening as measured along an arc from said longitudinal axis.

9. The apparatus of claim 8 wherein said four openings comprise a second opening, a third opening, a fourth opening and a fifth opening, said second opening spaced from said first opening at a point approximately 22.5 degrees from said first opening, said third opening spaced from said first opening at a point approximately 45 degrees from said first opening, said fourth opening spaced apart from said first opening at a point approximately 90 degrees from said first opening, and said fifth opening spaced apart from said first opening at a point approximately 112.5 degrees from said first opening, said spacings measured along an arc from said longitudinal axis.

10. The apparatus of claim 1 further comprising an outer filter member surrounding said core member.

11. The apparatus of claim 10 wherein said core member is eccentrically positioned within said outer filter member.

12. The apparatus of claim 10 wherein said outer filter member comprises a fiber roll.

13. The apparatus of claim 12 wherein said fiber roll comprises excelsior or straw.

14. The apparatus of claim 10 wherein said outer filter member comprises a porous foam material.

15. The apparatus of claim 1 wherein said first end of said core member is open.

16. The apparatus of claim 1 wherein said core member is a flexible plastic pipe.

17. The apparatus of claim 1 wherein said first open end comprises a coupler.

18. The apparatus of claim 17 further comprising a second elongated core member having a first open end comprising a coupler coupled to said coupler of said first elongated core member.

19. The apparatus of claim 18 wherein said coupler is a tee connector.

20. The apparatus of claim 19 further comprising an outlet pipe coupled to said tee connector.

21. The apparatus of claim 17 wherein said coupler is an elbow connector.

22. The apparatus of claim 21 wherein an outlet pipe is coupled to said elbow connector.

23. The apparatus of claim 17 wherein said second end is open.

24. The apparatus of claim 23 wherein said second end comprises a coupler.

25. The apparatus of claim 1 wherein said walled elongated core member comprises a corrugated pipe.

26. The apparatus of claim 25 wherein said pipe comprises a flexible plastic.

27. The apparatus of claim 26 wherein said pipe is a high-density polyethylene pipe.

28. An apparatus, comprising:
 (a) a walled elongated core member having a first end, a second end, and an interior space;
 (b) an outer filter member surrounding said core member; and
 (c) a ballast material filling at least a portion of said interior space, wherein said ballast material is gravel or sand.

29. The apparatus of claim 28 further comprising one or more openings in said wall communicating said interior space with the exterior of said core member.

30. The apparatus of claim 28 wherein said core member comprises a flexible plastic pipe.

31. The apparatus of claim 28 wherein said first end of said walled elongated core member is open.

32. An apparatus, comprising:
 (a) a walled elongated core member having a longitudinal axis and a periphery extending around said core member in a line perpendicular to said longitudinal axis, said core member further defined by a first end, a second end, an exterior surface and an interior space;
 (b) a plurality of ribs extending along at least a portion of said exterior surface of said elongated core member;
 (c) one or more openings in one or more of said ribs communicating said interior space with the exterior surface of said core member; and
 (d) an outer filter member surrounding said core member, wherein said core member is eccentrically positioned within said outer filter member.

33. The apparatus of claim 32 wherein said first end of said core member is open.

34. A soil erosion controlling wattle, comprising:
 (a) a walled elongated core member having a first end, a second end, and an interior space;
 (b) an outer filter member surrounding said core member; and
 (c) a ballast material filling at least a portion of said interior space.

* * * * *